United States Patent
Grüneklee et al.

(10) Patent No.: US 7,455,340 B2
(45) Date of Patent: Nov. 25, 2008

(54) REINFORCED SECTION

(75) Inventors: Axel Grüneklee, Duisberg (DE); Lothar Patberg, Aachen (DE); Ernst Weckenmann, Stuttgart (DE)

(73) Assignee: ThyssenKrupp Steel AG, Duisburg (DE)

( * ) Notice: Subject to any disclaimer, the term of this patent is extended or adjusted under 35 U.S.C. 154(b) by 0 days.

(21) Appl. No.: 10/563,182

(22) PCT Filed: Aug. 5, 2004

(86) PCT No.: PCT/EP2004/008755

§ 371 (c)(1),
(2), (4) Date: May 9, 2006

(87) PCT Pub. No.: WO2005/018847

PCT Pub. Date: Mar. 3, 2005

(65) Prior Publication Data

US 2006/0249969 A1    Nov. 9, 2006

(30) Foreign Application Priority Data

Aug. 19, 2003 (DE) .............................. 103 38 025

(51) Int. Cl.
*B62D 27/00* (2006.01)
(52) U.S. Cl. .................... 296/30; 296/203.03
(58) Field of Classification Search .................... 296/30, 296/29, 209, 203.03, 187.12, 146.6, 205, 296/193.06, 202, 203.01, 146.9
See application file for complete search history.

(56) References Cited

U.S. PATENT DOCUMENTS

| | | | | |
|---|---|---|---|---|
| 2,380,523 A | * | 7/1945 | Hicks et al. | 296/30 |
| 3,328,935 A | * | 7/1967 | Peras | 296/30 |
| 4,304,434 A | * | 12/1981 | Suzuki et al. | 296/203.03 |
| 4,911,495 A | * | 3/1990 | Haga et al. | 296/209 |
| 5,102,188 A | * | 4/1992 | Yamane | 296/205 |
| 5,116,161 A | * | 5/1992 | Faisst | 296/30 |
| 5,226,696 A | * | 7/1993 | Klages et al. | 296/203.01 |
| 5,242,209 A | * | 9/1993 | Yamauchi | 296/203.03 |
| 5,332,281 A | * | 7/1994 | Janotik et al. | 296/209 |
| 5,352,011 A | * | 10/1994 | Kihara et al. | 296/203.03 |
| 5,549,352 A | * | 8/1996 | Janotik et al. | 296/209 |
| 5,700,049 A | * | 12/1997 | Shibata | 296/203.03 |

(Continued)

FOREIGN PATENT DOCUMENTS

DE    19531982    3/1996

(Continued)

OTHER PUBLICATIONS

International Search Report for PCT/EP2004/008755 (in English and German).

*Primary Examiner*—Kiran B. Patel
(74) *Attorney, Agent, or Firm*—Proskauer Rose LLP

(57) ABSTRACT

The invention relates to a reinforced section for a vehicle supporting frame, said section connecting two pillars (8) of the vehicle supporting frame, in particular the C-pillars or D-pillars at their bases in the form of a transversal wall, whose ends, which are configured as pillar connection zones (6a, 7a), extend onto the pillars (8) by means of rounded corner reinforcements (6, 7). The invention is characterised in that the reinforced section and the corner reinforcements (6, 7) are configured as a one-piece double shell consisting of two blanks (10) produced in an internal high-pressure forming process and welded together around their periphery.

4 Claims, 4 Drawing Sheets

U.S. PATENT DOCUMENTS

Figure 3:
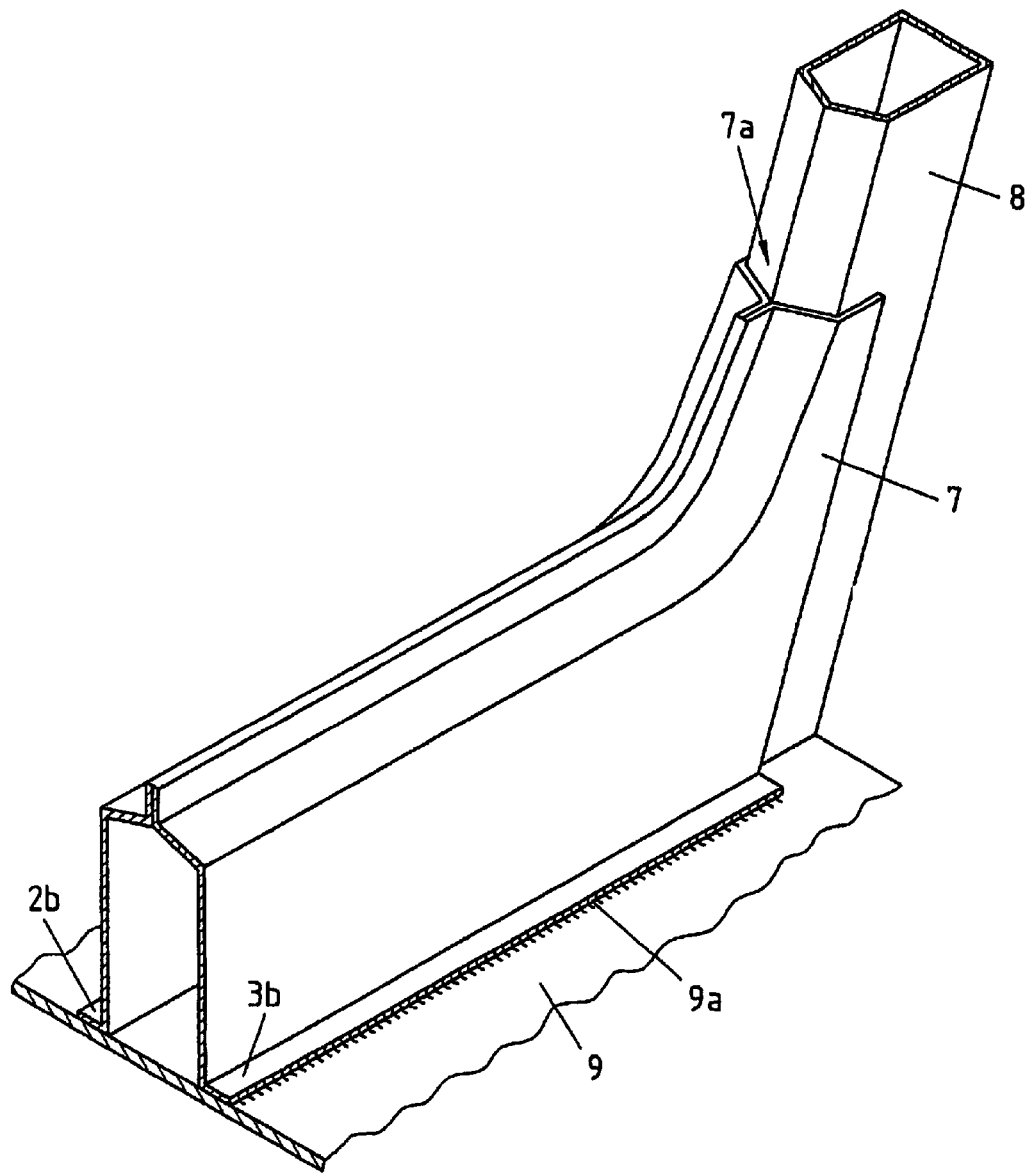

| | | | | |
|---|---|---|---|---|
| 6,010,182 | A * | 1/2000 | Townsend | 296/203.01 |
| 6,092,865 | A * | 7/2000 | Jaekel et al. | 296/205 |
| 6,129,412 | A * | 10/2000 | Tanuma | 296/204 |
| 6,241,310 | B1 * | 6/2001 | Patelczyk | 296/205 |
| 6,282,790 | B1 * | 9/2001 | Jaekel et al. | 296/205 |
| 6,293,617 | B1 * | 9/2001 | Sukegawa | 296/203.03 |
| 6,332,643 | B1 * | 12/2001 | Sukegawa et al. | 296/203.03 |
| 6,623,067 | B2 * | 9/2003 | Gabbianelli et al. | 296/205 |
| 6,814,401 | B2 * | 11/2004 | Takada | 296/202 |
| 6,824,204 | B2 * | 11/2004 | Gabbianelli et al. | 296/205 |
| 7,001,097 | B2 * | 2/2006 | Wang et al. | 296/29 |
| 7,070,228 | B2 * | 7/2006 | Shimizu et al. | 296/187.01 |
| 2001/0002760 | A1 * | 6/2001 | Gabbianelli et al. | 296/146.9 |
| 2003/0062742 | A1 | 4/2003 | Neale | |
| 2004/0140693 | A1 * | 7/2004 | Gibbianelli et al. | 296/203.01 |
| 2004/0232724 | A1 * | 11/2004 | Patberg | 296/146.9 |
| 2006/0066135 | A1 * | 3/2006 | Yatabe et al. | 296/203.01 |
| 2007/0063543 | A1 * | 3/2007 | Roccato et al. | 296/187.08 |
| 2007/0102964 | A1 * | 5/2007 | Yoshimoto et al. | 296/187.12 |
| 2008/0001434 | A1 * | 1/2008 | Henkelmann | 296/187.12 |

FOREIGN PATENT DOCUMENTS

| | | |
|---|---|---|
| DE | 195 35 870 A1 | 2/1997 |
| DE | 19651658 | 6/1998 |
| DE | 19818362 | 11/1999 |
| EP | 0 753 363 A1 | 1/1997 |
| GB | 510996 | 8/1939 |
| GB | 2293354 | 3/1996 |
| JP | 2001030951 | 2/2001 |

* cited by examiner

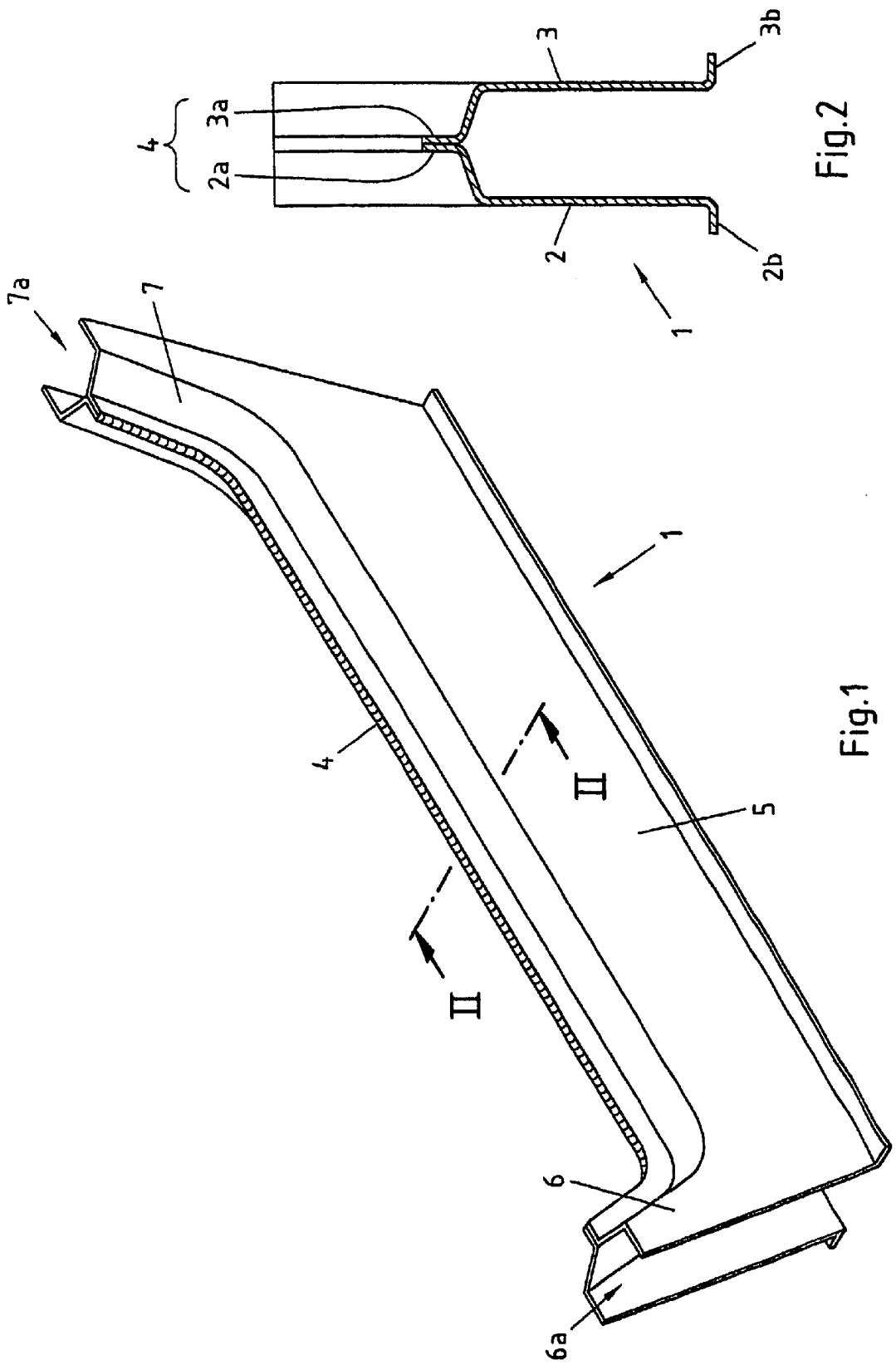

REINFORCED SECTION

BACKGROUND OF THE INVENTION

The invention relates to a reinforcing profile for a vehicle supporting frame, which connects at their bases two pillars of the vehicle supporting frame, in particular the C-pillars or D-pillars, as a vehicle transverse wall and at its ends formed as pillar connection zones merges via rounded corner reinforcements into the pillars.

In modern vehicle construction a rigid vehicle structure is fundamentally important for the driving properties and the crash safety of a vehicle. A suitable measure for achieving increased rigidity is to additionally brace the vehicle supporting frame by fitting, oriented transversely to the direction of travel, reinforcing profiles as vehicle transverse walls.

Reinforcing profiles of this type are known from practice. One such known reinforcing profile comprises a shell component constructed as a top hat profile which, in the fitted state, connects the supporting pillars at their bases and in the process is welded to the base panel. To make possible improved support of the pillars on the profile and at the same time a more uniform force progression in the structure, the reinforcing profile is supplemented by additional rounded corner reinforcements which encompass the profile at the corners formed by a respective pillar and a profile end as well as the respective pillar, and are secured thereto by welding. As a result of the rounded shape of the corner reinforcements the above-located horizontal outer surface of the top hat profile uniformly merges into the lateral surface of the pillar facing the reinforcing profile, from which the desired uniform course progression results. The corner reinforcements are also formed by shell components, each corner reinforcement usually comprising two parts for reshaping engineering reasons. As a consequence, in addition to the actual top hat-shaped shell component connecting the pillars, four further parts are required, that are to be connected to each other in pairs and to a pillar or the profile in order to produce a reinforcing profile for connecting two pillars with a sufficient supporting function. High costs both for the single-part production and for assembling the parts are associated with the large number of different parts. In addition, varying of the reinforcing profile dimensions is only possible with considerable expenditure as for this purpose newly configured tools have to be provided in each case for the component parts. Finally, the high number of welded joints, as a result of the construction, has an adverse effect, in particular when using higher strength steel materials as the base material as these are a lot less rigid compared with the base material and therefore constitute a factor that reduces the fatigue strength of the construction.

SUMMARY OF THE INVENTION

The object of the invention is therefore to provide a reinforcing profile of the type mentioned at the outset, by means of which the rigidity of the vehicle supporting frame is effectively increased, and which is distinguished by lower manufacturing costs and furthermore may be varied in its dimensions without great expenditure.

This object is achieved according to the invention with a reinforcing profile according to the precharacterising clause in that the reinforcing profile and the corner reinforcements are formed as a one-piece double shell from a hydroformed double blank welded at its peripheral edge.

The reinforcing profile according to the invention, even in the case of complex three-dimensional shaping, comprises a simple basic body, namely the one-piece double shell produced with the aid of hydroforming technology. As a result of the high variability with respect to the shape to be produced it is possible to form the rounded corner reinforcements, necessary for improved support and uniform force progression between the two pillars of the vehicle structure, in one piece with the reinforcing profile, whereby large pillar connection zones are produced that can be efficiently used. In contrast to the prior art, no further component parts thus have to be produced and assembled in addition to the actual profile, so the production costs may be considerably reduced. A further consequence of said variability is that the dimensions of the reinforcing profile may be adapted comparatively easily to the user's specifications. This applies to the radius of the rounded portion as well as to the height of the profile. In addition, the number of joins can be reduced to a minimum with the one-piece construction of the reinforcing profile, so the rigidity of the base material, in particular when using higher strength steel materials, can be optimally utilised and thus outstanding supporting properties can be attained.

For production engineering reasons the peripheral edge of the double blank is retained in the reinforcing profile as an edge which upwardly projects from the upper side of the profile and which extends over the entire length of the profile. This upper edge can be used as a flange for receiving seals or for mounting panelling components.

According to an advantageous configuration of the invention, at the base, the reinforcing profile also comprises edge regions bent at a right angle for connecting to the base panel of a vehicle body. These regions form connection zones that can be efficiently used, for example for a welded, soldered or glued joint.

The object of the invention is also achieved by a method for producing the reinforcing profile according to the invention, which method includes the following method steps:

hydroforming a double blank welded at its peripheral edge to form a double shell, lateral trimming of both sides of the reshaped double blank for producing pillar connection zones and dividing the length of the blank for producing two reinforcing profiles With hydroforming technology a method is used which allows the user a high degree of freedom of design with respect to the form to be produced. The particular advantage of hydroforming technology in relation to the material properties of the reshaped component, for example with respect to deep drawing, lies in the fact that the material to be reshaped is stretched much more intensively and homogeneously in the case of hydroforming. As a result of this material stretching, the "bake hardening" effect, i.e. the additional increase in rigidity with a heat treatment at relatively low temperatures, for example by paint stoving, can, in particular in the case of higher strength steels, be intensified. The rigidity values that can be achieved thereby allow a further reduction in the requisite material strengths and thus contribute to a reduction in the overall weight of the vehicle.

According to an advantageous configuration of the method it is provided that the peripheral edge of the double blank is welded at the end face by laser beam welding. This is a reliable joining method that can be well automated.

According to a further preferred embodiment of the method it is provided that the double blank is symmetrically formed with respect to its longitudinal axis and is divided along this longitudinal axis, so two identically constructed reinforcing profiles are produced. The identically formed profiles can subsequently be fitted in two vehicles, for example, at the same location in each case.

Alternatively, it is also possible to form the double blank asymmetrically with respect to its longitudinal axis, so two differently constructed reinforcing profiles are produced when it is divided along its length. These can be used at different locations in a vehicle, thus for example between the C- and D-pillars.

BREIF DESCRIPTION OF THE DRAWINGS

Figure 4A:
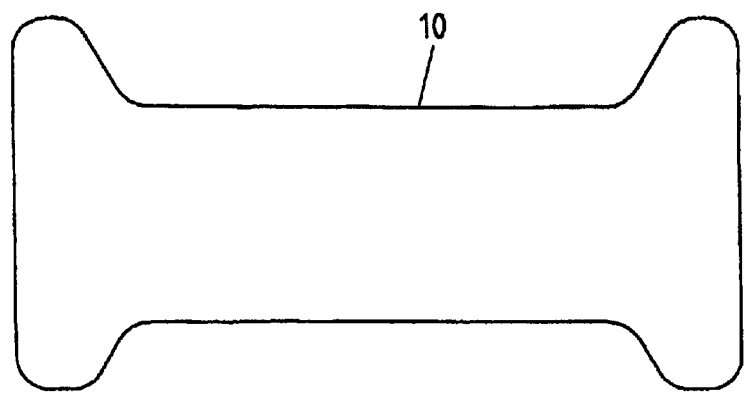
Figure 4B:
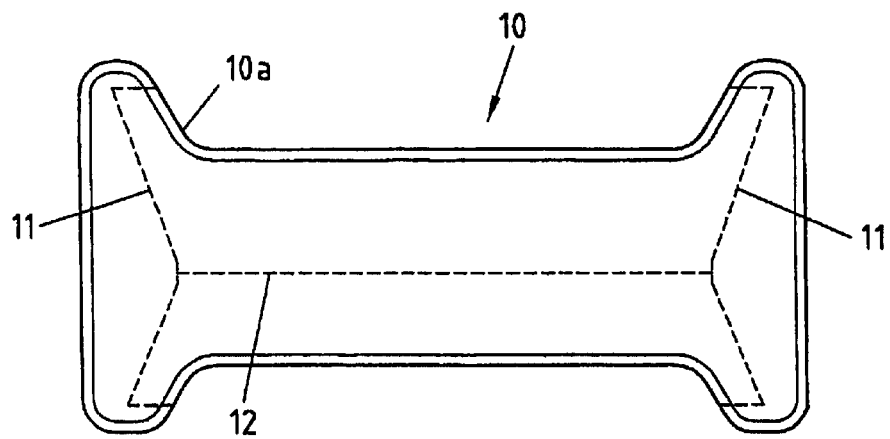
Figure 4C:
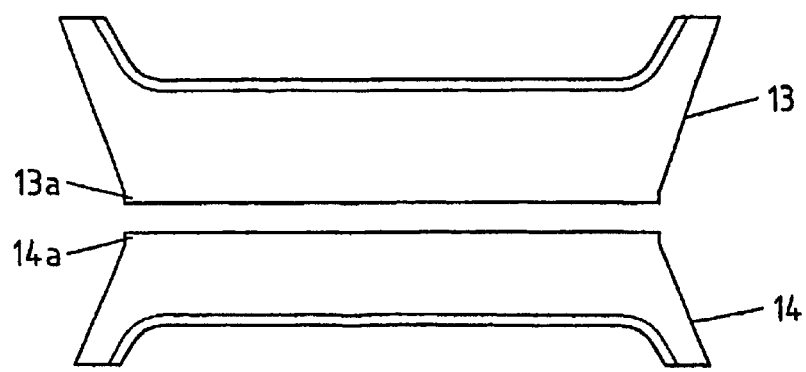
Figure 5:
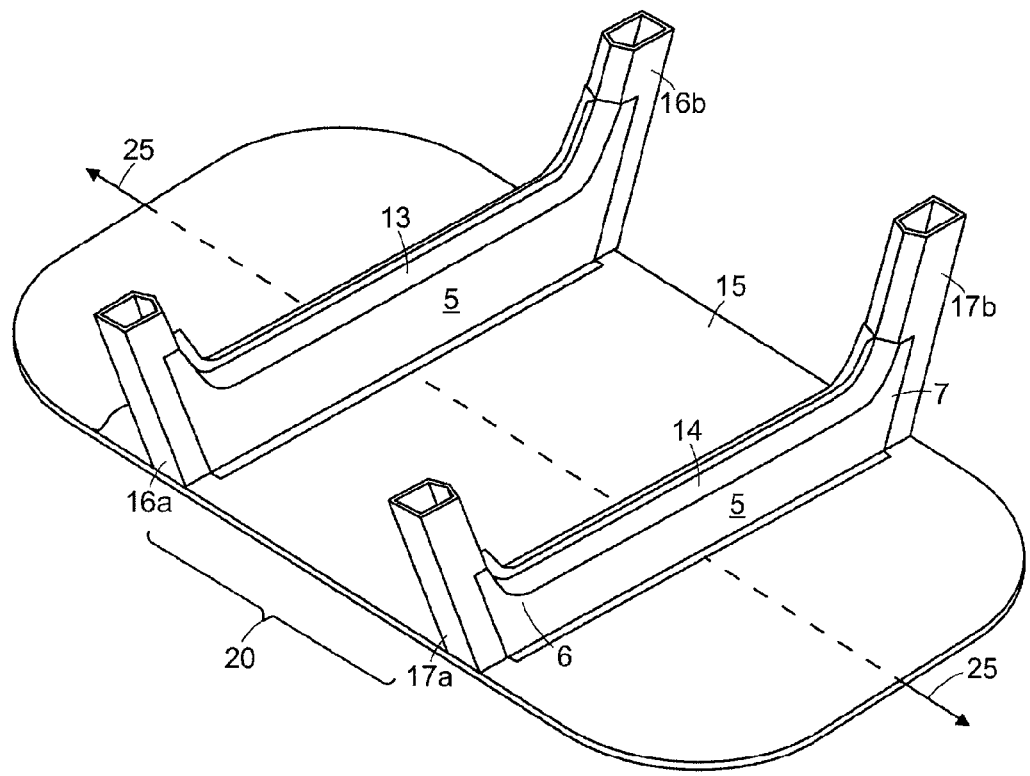

The invention will be described in more detail hereinafter with reference to drawings showing an embodiment, in which drawings:

FIG. 1 shows in a perspective view a reinforcing profile for connecting two pillars in a vehicle supporting frame, FIG. 2 shows the reinforcing profile of FIG. 1 in section along the line II-II of FIG. 1, FIG. 3 shows in a perspective section the reinforcing profile of FIG. 1 in the fitted state, FIGS. 4a to 4c show the method steps for producing the reinforcing profile of FIG. 1 and FIG. 5 shows in a schematic view two reinforcing profiles, produced from an asymmetric double blank, in the fitted state.

DETAILED DESCRIPTION OF THE INVENTION

The reinforcing profile of the invention according to FIG. 1 is produced by hydroforming from a double blank 1 which, in turn, comprises two individual blanks 2, 3 welded at their edges 2a, 3a, preferably by laser beam welding, the reinforcing profile comprises a straight middle region (i.e., a vehicle transverse wall) 5, with a substantially U-shaped cross-section, which merges at its two ends into rounded corner reinforcements 6, 7. As a result, large open pillar connection zones 6a, 7a are formed which allow a uniform progression of force between two pillars, supported on the reinforcing profile, of a vehicle supporting frame. The edges 2a, 3a, welded at the end face, of the individual blanks jointly form an upper edge 4 in the reinforcing profile, which edge can be used as a flange for receiving seals or for mounting panelling components. At the base, the reinforcing profile also comprises edge regions 2b, 3b that are bent at a right angle and form flanges which can be efficiently used for connecting the reinforcing profile to a base panel.

FIG. 3 shows the reinforcing profile in the fitted state. In this case the open pillar connection zone 7a encompasses a pillar 8 of a vehicle supporting frame, preferably a C- or D-pillar, and is connected thereto, for example via spot welds (not shown). In addition, the reinforcing profile is supported on a base panel 9 and connected thereto at the bent edge regions 2b, 3b by weld seams 9a.

FIGS. 4a to 4c show the individual method steps for producing the reinforcing profile. FIG. 4a shows a double blank 10, comprising two individual sheets lying flat one on top of the other, which blank is joined at its peripheral edge preferably by laser beam welding. The blank is slightly asymmetrically formed with respect to its longitudinal axis.

The double blank 10 is firstly reshaped by hydroforming to form a hollow body, a peripheral edge region 10a of the blank 10 being fixed between the reshaping tool halves and thus being retained in the reshaped component as a flat, outwardly pointing edge (FIG. 4b). As is also shown in FIG. 4b, in a subsequent step the reshaped double blank 10 is laterally trimmed along the lines 11 and subsequently longitudinally divided along the line 12, so two differently shaped reinforcing profiles 13, 14 with corner reinforcements are produced. In an additional step edge regions that are bent at a right angle are preferably formed at the base of the reinforcing profiles 13, 14 from the lower edges 13a, 14a, which edge regions facilitate connection of the reinforcing profiles to a base panel.

FIG. 5 schematically shows the reinforcing profiles 13, 14 produced in the above manner in the fitted state. In this case the reinforcing profiles 13, 14 are in each case arranged between a pair of pillars (either between 16a and 16b or between 17a and 17b) of a vehicle supporting frame 20 and are connected thereto by welding. As shown in FIG. 5 and previously described, the reinforcing profile (13, 14) includes the vehicle transverse wall 5 oriented transversely to a direction of travel 25 of the vehicle supporting frame 20. Each of the profiles 13, 14 is also supported on a body base panel 15 and connected thereto likewise by welding.

The invention claimed is:

1. A reinforcing profile for a vehicle supporting frame, the reinforcing profile comprises a vehicle transverse wall oriented transversely to a direction of travel with respect to the vehicle supporting frame, the vehicle transverse wall having rounded corner reinforcements to connect a pair of pillars of the vehicle supporting frame, wherein the vehicle transverse wall and the rounded corner reinforcements being formed as a one-piece double shell from a hydroformed double blank welded along a peripheral edge of the reinforcing profile.

2. The reinforcing profile according to claim 1, wherein an upper edge of the reinforcing profile forms a flange for receiving seals.

3. The reinforcing profile according to claim 1, wherein an upper edge of the reinforcing profile forms a flange for mounting paneling components.

4. The reinforcing profile according to claim 1, wherein the reinforcing profile further comprises edge regions disposed at a base of the reinforcing profile, the edge regions are bent at a right angle to connect to a base panel of a vehicle body.

* * * * *